April 26, 1960   E. R. DAYTON ET AL   2,934,743
NAVIGATION INSTRUMENT
Filed Jan. 11, 1957
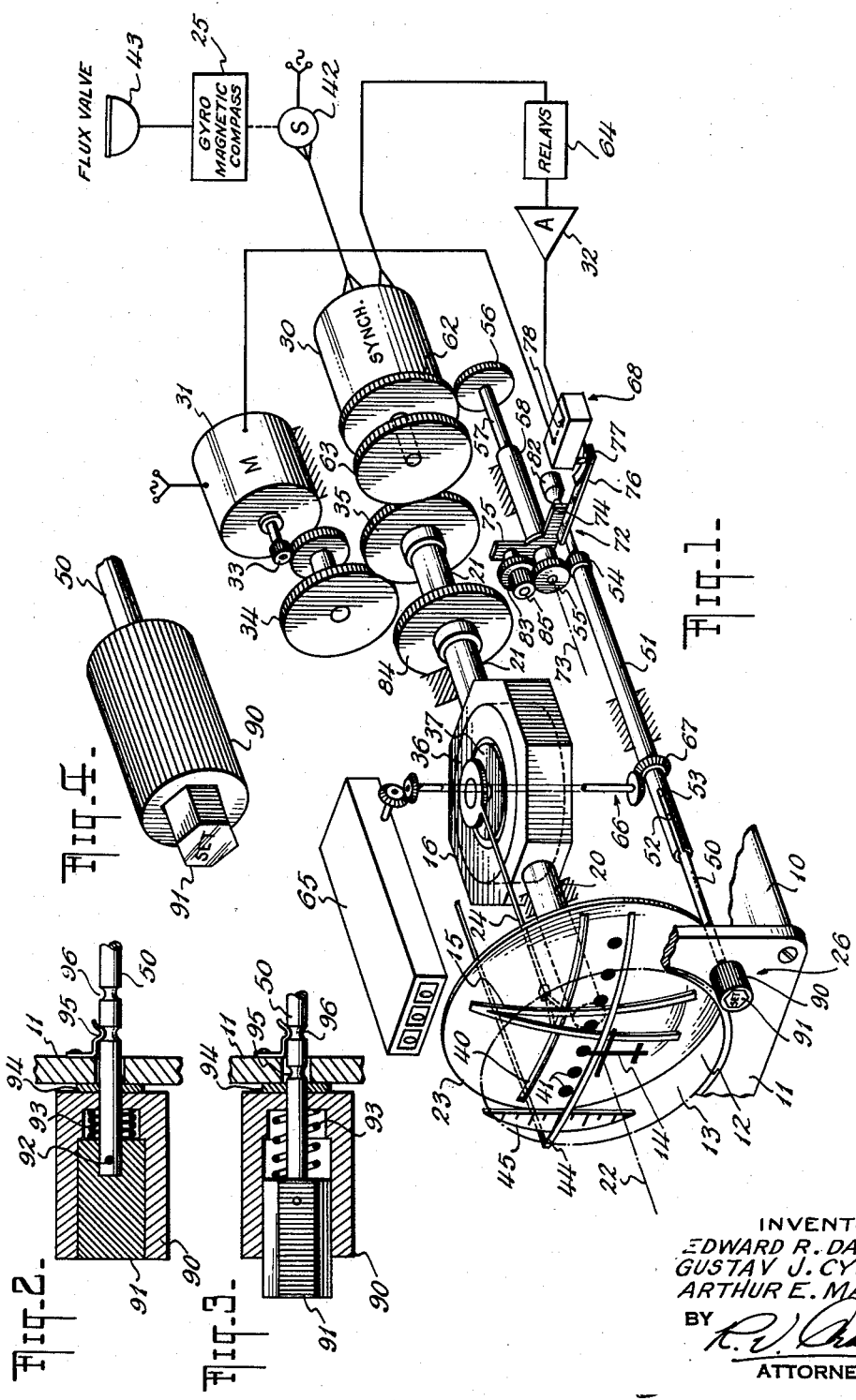
INVENTORS
EDWARD R. DAYTON
GUSTAV J. CYPSER
ARTHUR E. MAYER
BY
ATTORNEY

United States Patent Office 2,934,743
Patented Apr. 26, 1960

2,934,743
NAVIGATION INSTRUMENT

Edward R. Dayton, Huntington Station, Gustav J. Cypser, Woodbury, and Arthur E. Mayer, Carle Place, N.Y., assignors to Sperry Rand Corporation, a corporation of Delaware Application January 11, 1957, Serial No. 633,624

12 Claims. (Cl. 340—27)

This invention relates to navigation instruments and more particularly to such an instrument giving indications of at least two different quantities and in which, when the indication of one quantity becomes erroneous, the instrument may be manually adjusted so that the remaining accurate indication is usable.

One type of aircraft navigation instrument, when used for landing approaches has a movable V-shaped pointer indicative of a radio beam mounted adjacent a stationary indication of the craft. The pointer is mounted for rotation about an axis to show deviation of the craft heading from the radio beam and is mounted for movement at right angles to said axis to show the displacement of the craft from said beam.

In the initial phases of the landing approach, the V-shaped pointer may be at a substantial angle with the indication of the craft heading but as the pilot aligns the craft with the beam, the V pointer will become aligned with the craft indication. During this phase of the approach, lateral displacement of the V pointer with respect to the craft indication will indicate whether the craft is to the right or left of the landing beam.

During the approach, or previous thereto, the pilot may recognize that the heading deviation is not operating correctly. This might be apparent from erratic motion, or continuous full deflection of the V pointer about its rotational axis. The pilot might recognize the malfunction by comparison with a magnetic compass by a monitor or alarm system connected with the heading system, or by comparison with reference land marks or navigation data.

If the malfunction of the heading reference results in an erratic movement or an erroneous deflection, then when the craft is in the final stages of its approach, the correctly operating displacement indication becomes more or less valueless because the V pointer is in a rotational oscillation or because it is displaced rotationally so that right and left displacement from the localizer beam is indicated by up and down movement of the pointer that may be readily confused because the horizontally disposed glide slope bar is in superposition with the V pointer and is moving up and down to indicate displacement of the craft up and down with respect to the glide slope beam.

While the present invention has been described as being applied to an aircraft navigation instrument particularly, it is to be understood that the present invention is equally applicable to any instrument giving indications of at least two different quantities in which, when the indication of one quantity becomes erroneous, the instrument may be manually adjusted so that the remaining accurate indication is usable.

It is an additional object of this invention to provide a means in the type of instrument discussed above so that the pilot may manually disable the heading reference input and manually rotate the V pointer so that right and left direction thereof indicates right and left direction of the craft with respect to the beam.

It is a further object of this invention to provide a visual and tactual indicator showing the pilot that the heading reference has been disconnected.

It is an object of the present invention to provide a means which selectively renders the malfunctioning portion of an indicating system inoperative while affording a means for manually positioning the indicating element to a position where the remaining accurate indication is usable.

It is a further object of the present invention to provide a means which selectively renders at least a portion of the electrical system of an indicating instrument inoperative during malfunction, while simultaneously affording a means for manually positioning at least one of the indicating elements and apprising the pilot of the above condition.

This and other objects of the invention are accomplished by means to electrically disengage the malfunctioning portion of the indicating system from the indicating element and to simultaneously mechanically engage the indicating element to an actuating knob by manually positioning the knob. Within the actuating knob is a warning member that advises the pilot whether the malfunctioning portion of the indicating system is engaged or disengaged.

Other objects and advantages of the present invention, not at this time particularly enumerated, will become apparent as a description of the preferred embodiment of the present invention proceeds, especially when considered with respect to the accompanying drawings, in which like reference characters indicate like elements, wherein:

Fig. 1 is a schematic illustration of a preferred embodiment of the present invention as applied to a typical aircraft navigation instrument;

Fig. 2 is a side view in section of the control knob in an "in" position;

Fig. 3 is a side view in section of the control knob in an "out" position.

Fig. 4 is a perspective view of the control knob in an "out" position.

Referring now to Fig. 1, which shows the present invention as applied to an aircraft navigation instrument of the type disclosed in U.S. Patent No. 2,732,550 entitled Display Instrument for Radio Navigation Systems issued January 24, 1956, to E. F. Reedy and assigned to the same assignee as the present invention, reference character 10 designates the instrument housing having a front wall or bezel 11 with an opening 12 therein through which the various indicating members may be viewed. The opening 12 may be provided with a suitable cover or bezel glass 13 for protecting the interior of the instrument from dust, dirt, moisture, etc. Situated preferably at the center of opening 12 is an aircraft reference index 14 which may be engraved or otherwise delineated on the inner surface of the bezel glass 13 or rigidly supported on a suitable, preferably inconspicuous, post as desired. Reference index 14 represents by its shape the direction of travel of the aircraft with respect to a predetermined radio beam, it being assumed that the aircraft is heading in a direction corresponding to the top of the instrument face. The aircraft reference index 14 is a plan representation of a typical or conventional aircraft having a fuselage and laterally extending wings and horizontal stabilizer.

The aircraft index 14 is fixed relative to the instrument housing 10 and hence relative to the aircraft and is so positioned on the glass 13 that the fuselage of the representative aircraft index 14 is vertical, with the intersection of the wings and the fuselage at the center of the opening 12.

Viewable through the instrument opening 12 and cooperable with aircraft reference index 14 is an indicating member or pointer 15 which simulates by its shape the direction of propagation of a navigational radio beam. As shown in Fig. 1, this indicating member or pointer 15 is constructed in the form of a wedge or an elongated, narrow V. The wedge shaped or V-shaped pointer 15 represents to the pilot a strikingly familiar radio beam pattern which clearly designates the direction of propagation thereof from the transmitter or range station, i.e., the typical and familiar beam representation used on aircraft charts and maps. Although the radio waves travel from a station in a direction away from the transmitting antenna, it will be understood that the pointer 15 designates by its shape the diverging radio beam with its apex pointed towards the station. For example, if the bearing of a course defined by a radio beam toward a particular station is, say 60°, the direction of propagation of the beam is considered to be 60°, although, of course, the radio waves actually travel in the opposite direction.

Pointer 15 is adapted to be rotated, preferably about the center of the opening 12 as an axis, to an angle equal to the difference between the selected magnetic bearing, i.e., the bearing of the radio course to be flown, and the magnetic heading of the aircraft. Furthermore, the pointer 15 is adapted to be displaced in directions substantially radially from said axis and hence radially from said aircraft reference index 14 as a function of the magnitude and sense of the displacement of the aircraft from the radio-defined course. When the aircraft heading corresponds to the bearing of the radio beam and is on the beam, the longitudinal axis of index 14 will be aligned with the longitudinal axis of pointer 15 with the index 14 indicating travel towards the apex of pointer 15, as illustrated in Fig. 1. With this instrument, the pilot is informed as to his position and direction of travel relative to a selected radio-defined course.

V-shaped pointer 15 is supported in the instrument housing 10 by means of a gimbal-like arrangement illustrated schematically in Fig. 1 which comprises a gimbal frame 16 pivotally supported in suitable bearings by shafts 20 and 21 concentric with an axis 22 and preferably aligned with the center of the opening 12. Secured to the end of shaft 20 is a background member 23 for the pointer 15 which may be in the form of a truncated sphere having a radius substantially equal to the radius of pivotal movement of the pointer actuating arm 24 and of such size that the peripheral edge of member 23 extends in all directions beyond the edge of opening 12. Gimbal frame 16 and hence background member 23 is stabilized in space about axis 22 in a manner to maintain the pointer 15 directed in a direction parallel to the magnetic bearing of a selected radio beam regardless of changes in heading of the aircraft by means of a suitable magnetic reference such as, for example, by a slaved gyromagnetic compass 25, a bearing selector means including knob 26, synchro 30, and servomotor 31 energized from a suitable heading servo amplifier 32 in a manner to be described, the servomotor 31 driving gimbal 16 through suitable gearing 33, 34 and 35.

V-shaped pointer 15 is displaced laterally of said aircraft reference 14 by suitable motive means such as, for example, a meter movement 36, the rotor 37 of which is pivotally supported in gimbal frame 16 for limited rotation about an axis at right angles to the axis of rotation of gimbal frame 16. Pointer 15 is operatively connected with meter movement 36 by means of an arm 24 which extends from the rotor 37 of the meter movement 36 through a suitable slot 40 in spherical backgorund 23. The magnitude of displacement of the aircraft from the selected radio beam is indicated to the pilot by suitable calibrations in the form of a series of dots 41 extending parallel to the slot 40. Meter movement 36 is excited with right-left radio displacement signals from a suitable radio receiving apparatus (not shown) in a manner more fully disclosed in the aforesaid Patent No. 2,732,550. In a similar manner, glide slope bar 44 is actuated in accordance with signals from a glide slope receiver (not shown) to indicate vertical deviations from the glide slope beam which may be interpreted with relation to a suitable scale 45 or with respect to the laterally extending wings of reference index 14.

The gimbal 16 is stabilized about axis 22 in a manner to maintain the point 15 directed in a direction indicative of the magnetic bearing of a selected radio beam regardless of changes of heading of the aircraft by means of the positional servo loop between it and slaved gyromagnetic compass 25. In other words, the servo loop operates to positon the gimbal 16 and hence pointer 15 relative to the aircraft reference index 14 in accordance with the angular difference between the bearing of the selected course and the heading of the aircraft relative to magnetic north. As shown, slaved gyromagnetic compass 25 provides a signal at synchro transmitter 42 corresponding to the heading of the aircraft relative to magnetic north as established by a suitable magnetic reference such as flux valve 43, which signal appears on the rotatably mounted stator windings of synchro 30. The stator windings of synchro 30 are rotated to a position corresponding to the magnetic bearing of the selected radio course by means of bearing selector knob 26 in a manner to be described, thus rotating the magnetic heading vector generated in synchro 30 by synchro 42, to an angle corresponding to the angular difference between the bearing of the selected course and the heading of the craft relative to magnetic north.

The bearing selector knob 26 is connected to one end of shaft 50, which is slidably positionable within tubular shaft 51 but shaft 50 is prevented from rotating with respect to shaft 51 by means of pin 52 that rides in slot 53 that is in shaft 51. Shaft 51 is itself rotatably mounted within housing 10 by suitable bearing means. One end of shaft 51 has connected thereto pinion gear 54 which drives gear 55. Gear 55 is connected to gear 56 by means of shaft 57, said shaft 57 being rotatable within tubular shaft 58. Gear 56 drivably meshes with gear 62 that is connected to the stator of synchro 30 thereby driving the stator windings thereof.

If the gimbal 16 is at a position other than that corresponding to the direction of the aforementioned resulting electrical vector, an error signal will be generated in the rotor winding of synchro 30 which is drivably coupled with gimbal 16 by means of gear 35 meshing with gear 63 that in turn drives the rotor winding. The error signal is applied through suitable relays 64, more fully described in aforesaid Patent No. 2,732,550, to the heading servo amplifier 32. The output of amplifier 32 is supplied through normally closed switch 68 to the control winding of heading servomotor 31 to thereby rotate gimbal 16 through gearing 33, 34 and 35 and also the rotor of synchro 30 through gearing 35 and 63 in a direction and to an amount such as to zero this positional error. In the illustrated embodiment, synchro 30 comprises a conventional control transformer, the stator of which is rotatably mounted in the instrument housing 10 so that in effect this synchro functions as a differential synchro.

The magnetic bearing of the selected radio course may be indicated to the pilot by means of a drum-type counter 65 located preferably at the top of the instrument housing 10. The counter 65 is driven by bearing selector knob 26 through suitable shaft and gearing 66, the latter being drivably connected to suitable gearing 67 on shaft 51. The structural details of the bearing selector counter 65 are illustrated in the aforesaid Patent No. 2,732,550.

Thus, in the above construction, V-shaped pointer 15 is positioned about axis 22 to the bearing of the selected radio course regardless of the heading of the aircraft, that is, it is positioned relative to aircraft index 14 in accordance with the difference between the bearing of the course and the heading of the aircraft relative to magnetic north. As such, when the pilot is navigating the aircraft on the basis of the information provided by pointer 15, it is of the utmost importance that the pictorial display be accurate. In the event the display is not accurate due to a malfunction of the servo system, for example, the pilot should be able to simultaneously disconnect the servo system and introduce signals manually to mechanically position pointer 15.

This may be accomplished as shown by the preferred embodiment of the present invention indicated in Fig. 1 wherein bell crank 72 is pivotally mounted about axis 73 by virtue of being connected to tubular shaft 58 which itself is rotatably mounted relative to the housing 10 within suitable bearing means about axis 73. Preferably, axis 73 is coincident with the longitudinal axes of shafts 57 and 58. Connected to arm 74 of bell crank 72 is a resilient member in the form of a flat spring 76 that cooperates with lever 77 on switch 68. In the normal operating condition, lever 77 provides a force equal and opposite to the spring force provided by the spring 76 to maintain bell crank 72 in its normal operating position, as shown, and the contact arm 78 of switch 68 is in a closed position, as shown, connecting the amplifier 32 to the servomotor 31. The force provided by lever 77 produces a moment on bell crank 72 about the pivot axis 73 tending to move the bell crank 72 in a clockwise direction as viewed in the drawing.

A cam member 82 is connected to the other end of shaft 50 and is axially positionable in accordance with the movement of shaft 50. When shaft 50 is positioned in its outermost position by pulling out bearing selector knob 26, the sloping face of cam 82 abuts against arm 74 tending to rotate bell crank 72 in a counter-clockwise direction about pivot axis 73 against the resilient force of spring 76 thereby positioning bell crank 72 in its furthest counter-clockwise position. The furthest counter-clockwise position of bell crank 72 is achieved when idler gear 83 meshes with gear 84. Idler gear 83 is rotatably mounted on arm 75 of bell crank 72 and is fixed to rotate with a driven gear 85 that meshes with gear 55. Gear 84 is mounted on shaft 21 in a manner similar to gear 35 for driving gimbal 16.

For emergency operation, when there is a malfunction in the servo system, for example, the pilot pulls out bearing selector knob 26 to its outermost position. This positions cam 82 against arm 74 of bell crank 72 overcoming the resilient force of the spring 76 thereby rotating bell crank 72 in a counter-clockwise direction until idler gear 83 engages gear 84. Simultaneously, lever 77 of switch 68 is positioned upward as shown in the drawing by spring 76 thereby disengaging contact arm 78 to break the electrical connection between amplifier 32 and servo motor 31, thus disconnecting the servo system. With idler gear 83 meshing with gear 84, when the pilot turns knob 26, the pointer 15 is rotated by virtue of the rotation of shafts 50 and 51 through gearing 54, 55, 85, 83 and 84, which drives gimbal 16 to position the pointer 15. During this time the electrical portion of the servo system is disconnected, but through gear 54, 55, 56 and 62 the stator windings of synchro 30 have been rotated as previously, while through gearing 54, 55, 85, 83, 84, 35 and 63, the rotor winding of synchro 30 has also been positioned.

Pulling out the bearing selector knob 26 thus does two things: First, a switch 68 controlling the motor 31 of the servo system is opened, electrically incapacitating the servo system. Second, the knob 26 is mechanically connected to pointer 15 which was previously driven by the servo system. This mechanical engagement is accomplished by actuating a bell crank 72 which throws an additional gear 83 into mesh between the knob shaft 50—51 and the display shaft 20—21. The pilot can then turn the pointer 15 through the knob 26 to a position where it is usable. For example, the pointer 15 of the aforementioned instrument may be rotated to a vertical position to give the pilot natural left-right sensing equivalent to the indications provided by a conventional 1LS pointer. Although the heading actuation of pointer 15 has been rendered inoperative, when the pointer 15 is in the vertical position, it continues to provide accurate information regarding the relative displacement of the craft from the desired localizer radio beam because it continues to be actuated laterally by meter movement 36 which is still operative. Particularly during the approach phase, the actuation of pointer 15, while in the vertical position, in accordance with right-left radio displacement signals is important in order to provide the pilot with usable information necessary for a successful approach to the runway.

An additional feature of the present invention is in the design of the bearing selector push-pull knob 26 per se. The knob 26 as shown in Fig. 1 and as can be seen more clearly in Figs. 2, 3 and 4, comprises a cylindrical outer shell portion 90 that is disposed to slide fore and aft upon the hexagonal-shaped inner portion 91. The inner portion 91 of the knob 26 is attached by pin 92 seen in Fig. 2 to shaft 50 which has suitable detents 95 and 96 to hold it either in the "in" or "out" position. Alternatively, the detents 95 and 96 may be eliminated and the spring 76 may be designed to supply sufficient friction between arm 74 and the flat surface of cam 82 to prevent axial movement of the latter and therefore knob 26. The inner portion 91 of knob 26 is spring loaded against the outer portion 90 of the knob 26 by means of a resilient spring member 93 intermediate therewith. A friction disc 94 is mounted on bezel 11 and cooperates with outer portion 90 of knob 26 to prevent inadvertent rotation of shaft 50.

When the cylindrical outer portion 90 of the knob 26 is rotated, shaft 50 is rotated accordingly through the hexagonal inner portion 91. With knob 26 in the "in" position, the hexagonal inner portion 91 of the knob 26 is buried within the outer cylindrical portion 90 and appears as a solid cylinder to the pilot as shown in Figs. 1 and 2. When the knob 26 is pulled to the "out" position and then released, the outer cylindrical portion 90 is pushed towards the bezel 11 of the instrument by virtue of the spring 93, thus exposing a portion of the hexagonal inner portion 91 of knob 26 as seen in Figs. 3 and 4. With the hexagonal inner portion 91 painted some bright alternate colors, such as red and white, the pilot has a strong visual signal that the knob 26 is in the "out" position and the servo system is disengaged. The peculiar hexagonal shape further provides a strong tactile signal to the pilot when he touches the knob 26. To re-engage the system, the shaft 50 is moved to the "in" position by the operator merely pushing the inner portion 91 of the knob 26 until it is flush with the outer portion 90. The resilient force of spring 76 returns bell crank 72 to its normal position thereby closing contact arm 78 and re-engaging the servo system.

While we have described our invention in its preferred embodiments, it is to be understood that the words which we have used are words of description rather than of limitation and that changes within the purview of the appended claims may be made without departing from the true scope and spirit of our invention in its broader aspects.

What is claimed is:

1. An indicating instrument having at least one driven member, first actuating means for driving said indicating member in accordance with a first signal, second actuating means for driving said indicating member in accordance with a second signal, manually operable means for normally changing the position of said indicating member through said first actuating means, and third actuating means operated by said manually operable means for rendering said first actuating means inoperative and for simultaneously positioning said indicating member whereby the actuation of said indicating member by said second actuating means is usable.

2. An indicating instrument of the character described in claim 1, including means for indicating to the operator that said first actuating means is inoperative.

3. In combination with an indicating instrument, an indicating element, means for mounting said indicating element for positioning about a first axis, first operating means for positioning said indicating element about said first axis in accordance with a said first signal, means for mounting said indicating element for positioning about a second axis, second operating means for positioning said indicating element about said second axis in accordance with a second signal, and manually operable means selectively associated with said first operating means and said indicating element for disabling said first operating means and for permitting selective positioning of said indicating element about said first axis.

4. A device of the character described in claim 3, including means for indicating to the operator that a portion of said device has been rendered inoperative.

5. In combination with an indicating instrument, a pointer, means for mounting said pointer to rotate about a first axis, first operating means to rotate said pointer about said first axis in accordance with the angular deviation of the craft's heading from a desired course, means for mounting said pointer to move about a second axis at right angles to said first axis, second operating means to move said pointer about said second axis in accordance with the lateral displacement of the craft from said desired course, manually operable means, selectively associated with said first operating means and said pointer to disable said first operating means and to permit selective rotation of said pointer about said first axis whereby the movement of said pointer by said second operating means provides usable information.

6. In a navigation instrument having at least one indicating member normally actuated by a servo system responsive to signals from a remote reference device, manually operable means for normally changing the relative position of said indicating member and said reference device through said servo system, and means selectively operated by said manually operable means for rendering said servo system inoperative and for simultaneously manually positioning said indicating member.

7. A navigation instrument of the character described in claim 6, including means for indicating to the pilot that said servo system is inoperative.

8. In a navigation instrument having at least one driven indicating member, motor means for normally driving said indicating member in accordance with a desired signal, and means for simultaneously rendering said motor means inoperative and manually actuating said indicating member, said last mentioned means including means for visually indicating to the pilot that said motor means is inoperative.

9. In a navigation instrument having at least one indicating member thereof normally actuated through a servo system responsive to signals from a remote reference device, manually operable means for normally changing the relative position of said indicating member and said reference device through said servo system, and means operated by said manually operable means for rendering said servo system inoperative and for simultaneously manually positioning said indicating member including an idler gear normally driven by said manually operable means and adapted to engage said indicating member and further including a cam means associated with said manually operable member for simultaneously rendering said servo system inoperative and moving said idler gear into engagement with said indicating member upon actuation thereof.

10. In a navigation instrument of the character described in claim 9, including means for indicating to the pilot that said system is operative.

11. A navigation instrument comprising a pointer, summation means for positioning said pointer in a first respect in accordance with first and second inputs, means for positioning said pointer in a second respect in accordance with a third input, and means for selectively disconnecting said second input and positioning said pointer in said first respect whereby said pointer is able to provide usable information in said second respect.

12. A navigation instrument of the character described in claim 11 wherein said last mentioned means is manually operable and includes means for indicating to the pilot that said second input is disconnected.

References Cited in the file of this patent

UNITED STATES PATENTS

| | | |
|---|---|---|
| 2,613,350 | Kellogg | Oct. 7, 1952 |
| 2,613,352 | Kellogg | Oct. 7, 1952 |